UNITED STATES PATENT OFFICE.

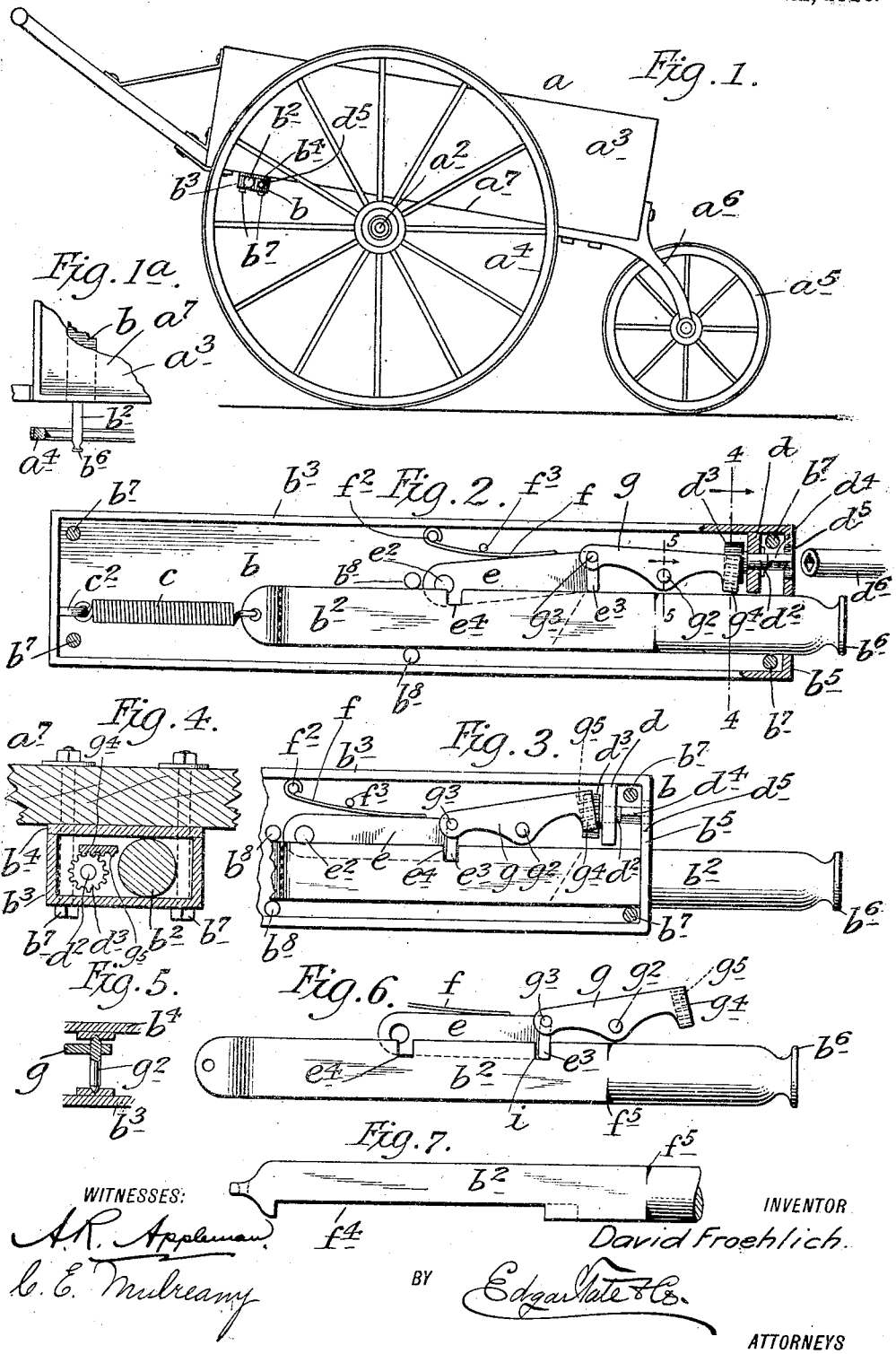

DAVID FROEHLICH, OF NEW YORK, N. Y.

LOCK FOR VEHICLES.

950,262.   Specification of Letters Patent.   Patented Feb. 22, 1910.

Application filed October 20, 1909. Serial No. 523,643.

*To all whom it may concern:*

Be it known that I, DAVID FROEHLICH, a subject of the Emperor of Austria-Hungary, and residing at New York, in the county of New York and State of New York, have invented certain new and useful Improvements in Locks for Vehicles, of which the following is a specification, such as will enable those skilled in the art to which it appertains to make and use the same.

This invention relates to locks for vehicles, and the object thereof is to provide an improved device of this class designed particularly for use in connection with what are known as push carts or delivery carts, but which may be used in connection with various kinds and classes of vehicles, and with this and other objects in view the invention consists in a device of the class specified constructed as hereinafter described and claimed.

The invention is fully disclosed in the following specification of which the accompanying drawing forms a part, in which the separate parts of my improvement are designated by suitable reference characters in each of the views, and in which:—

Figure 1 is a side view of an ordinary push or delivery cart provided with my improved lock. Fig. 1ª a sectional plan view of one corner of the body of the cart and showing a part of one of the wheels and showing how my improved lock operates. Fig. 2 a sectional plan view of the lock detached, the cover of the casing thereof being removed. Fig. 3 a sectional plan view of one end portion of the lock with the cover of the casing removed and showing the parts in a position different from that shown in Fig. 2. Fig. 4 a cross section on the line 4—4 of Fig. 2 but showing the lock in position for use and showing the bottom of the vehicle to which the lock is secured in section. Fig. 5 a partial cross section on the line 5—5 of Fig. 2. Fig. 6 a plan view of the locking bolt and showing other operative parts connected therewith and showing a modification of the construction shown in Figs. 2 and 3, and Fig. 7 a side view of the locking bolt of my improved lock.

In the drawing forming part of this specification reference being made to Figs. 1 and 1ª, I have shown at $a$ an ordinary push cart comprising, in its construction, an axle $a^2$ and a bed or body $a^3$ mounted thereon or thereover, and the axle $a^2$ is provided with the usual side wheels $a^4$, and at the front of the vehicle is a center or guide wheel $a^5$ connected with the bed or body by a suitable support $a^6$ which is secured to said bed or body: but it will be understood that the vehicle proper may be of any desired construction and may have a running gear or truck construction of any kind or class.

In the construction shown my improved lock $b$ is secured to and transversely of the bottom $a^7$ of the bed or body $a^3$ and is provided with a lock bolt $b^2$ adapted to be projected between two of the spokes of one of the wheels so as to lock the vehicle.

The lock $b$ comprises an oblong casing $b^3$ having a removable cover $b^4$ and the bolt $b^2$ of the lock is movable through one end portion $b^5$ of the casing $b^3$, which for the purpose of this description will be called the righthand end of said casing, and said bolt $b^2$ is preferably provided with a head $b^6$. The cover $b^4$ of the casing $b^3$ of the lock may be connected with said casing by corner screws, bolts or pins $b^7$, or in any desired manner, and said casing is provided centrally thereof, in the construction shown, with two studs or pins $b^8$ which are connected with the bottom of said casing in any desired manner and between which the bolt $b^2$ is movable, and secured to the inner end of said bolt is a contractile spring $c$ which is also secured to the end of said casing opposite that through which the bolt $b^2$ passes, as shown at $c^2$. Within the right hand portion of the casing $b^3$ and adjacent to said end is a transverse bearing or support $d$ through which passes a lock spindle $d^2$, the inner end of which is provided with a pinion $d^3$ and the outer end portion $d^4$ of which is angular in cross section, and the end $b^5$ of the casing is provided with an opening or aperture $d^5$ through which, in practice, is passed a key $d^6$ adapted to engage the end $d^4$ of the spindle $d^2$ and by means of which said spindle and the pinion $d^3$ may be turned. An arm $e$ is pivoted centrally of the casing $b^3$ as shown at $e^2$ and a spring $f$ is secured at $f^2$ and bears on the arm $e$ and said spring is held in an operative position by a pin or stud $f^3$. In the construction shown the inner end portion of the bolt $b^2$ is rectangular in cross section and is provided with a longitudinal recess $f^4$ in which the arm $e$ operates and said bolt is also provided with stops or shoulders $f^5$ which limit the outward movement thereof. The arm $e$ is also provided at its free end with a transverse nose piece or projection $e^3$ adapted to enter a recess $e^4$ in the adjacent side of the bolt $b^2$, and a lever $g$ is pivoted between the arm $e$ and the end $b^5$ of the casing $b^3$, as shown at $g^2$, by means of a pin cast in or secured in said lever, and one end of said lever is pivoted to the arm $e$ at $g^3$ and the other end is provided with a transverse head $g^4$, having on its under side teeth $g^5$ which mesh with the pinion $d^3$ and by turning the spindle $d^2$ the lever $g$ may be operated to throw the free end of the arm $e$ outwardly against the operation of the spring $f$ so as to release the bolt $b^2$.

In practice the lock is secured to the bottom of the body $a^3$ of the vehicle, in the form of construction shown, by the bolts or similar devices $b^7$, and the normal position of the parts of the lock is that shown in Fig. 2 in which the bolt $b^2$ is withdrawn into the casing $b^3$ by means of the spring $c$. Whenever it is desired to lock the vehicle, the bolt $b^2$ is pulled out by grasping the head $b^6$ until it projects between the spokes of the adjacent wheel $a^4$, as shown in Fig. 1a, and at the limit of this outward movement the arm $e$ is forced inwardly by the spring $f$ and the transverse nose or projection $e^3$ at the free end of said arm enters the recess $e^4$ in said bolt, as shown in Fig. 3, and the vehicle is locked. Whenever it is desired to unlock the vehicle the key $d^6$ is inserted through the opening or aperture $d^5$ and engages the end $d^4$ of the spindle $d^2$ and said key is turned to the left. This operation forces the outer end of the lever $g$ inwardly and the inner end of said lever outwardly and the free end of the arm $e$ is also thrown outwardly and disengaged from the bolt $b^2$, and the spring $c$ withdraws said bolt into the position shown in Fig. 2 and the vehicle is unlocked.

In Fig. 6 I have shown a modification by means of which the bolt $b^2$ may be locked in both its innermost and outermost positions and all that is necessary to accomplish this result is to provide said bolt with a supplemental recess $i$ adapted to receive the nose piece or projection $e^3$ of the arm $e$ when said bolt is in its innermost position. With this form of construction the lever $g$ must be operated by means of the key $d^6$ and the spindle $d^2$ and pinion $d^3$ to release the bolt $b^2$ in order to pull it out and lock the vehicle, and the bolt is locked in its outermost position by the nose piece or projection $e^3$ of the arm $e$ when it enters the recess $e^4$ as hereinbefore described.

It is a well-known fact that push carts or delivery vehicles of the class shown and described are frequently stolen when left by the operator thereof, and this is sometimes done when said carts or vehicles are loaded with articles to be delivered but with my improvement the stealing of such carts or vehicles is made impossible.

Although I have shown and described my improved lock as applied to a push cart or similar vehicle it will be apparent that the use thereof is not limited to vehicles of this class and the said lock may be employed in connection with other kinds or classes of vehicles or wherever such a device may be used. My invention is also not limited to the exact details of the construction herein shown and described and various changes therein and modifications thereof may be made within the scope of the appended claims without departing from the spirit of my invention or sacrificing its advantages.

Having fully described my invention what I claim as new, and desire to secure by Letters Patent is:—

1. A lock device of the class described, comprising an oblong casing, a bolt movable through one end thereof, a spring for drawing said bolt into said casing, a spring operated arm pivoted centrally of said casing and extending in the direction of the end thereof through which said bolt is movable, said arm being adapted to engage said bolt when in its outermost position, a lever pivoted between the free end of said arm and the end of the casing through which said bolt is movable, the inner end of said lever being pivotally connected with said arm and the outer end thereof being provided with gear teeth and a key operated spindle mounted in the end portion of said casing through which said bolt is movable and provided with a pinion which meshes with said gear teeth.

2. A lock of the class described, comprising a casing, a bolt movable through one end thereof, a spring for drawing said bolt into said casing, a spring operated arm pivoted centrally of said casing and extending in the direction of the end thereof through which said bolt is movable, said arm being adapted to engage said bolt both in its innermost and outermost position, a lever pivoted between the free end of said arm and the end of the casing through which the bolt is movable, the inner end of said lever being pivoted to said arm and the outer end thereof being provided with gear teeth, and a key operated spindle mounted in the end portion of said casing through which said bolt is movable and provided with a pinion adapted to engage with the teeth of said lever.

In testimony that I claim the foregoing as my invention I have signed my name in presence of the subscribing witnesses this 18th day of October 1909.

DAVID FROEHLICH.

Witnesses:
C. E. MULREANY,
B. M. RYERSON.